United States Patent

Shi et al.

[11] Patent Number: 5,543,372
[45] Date of Patent: Aug. 6, 1996

[54] STABLE HIGH SOLIDS SLURRIES OF STRUCTURED CLAY MATERIALS AND PROCESS FOR THE MANUFACTURE THEREOF

[75] Inventors: Joseph C. S. Shi, Bartow; William H. Blue, Wrightsville; Jeffrey C. Bruns, Sandersville, all of Ga.

[73] Assignee: Thiele Kaolin Company, Sandersville, Ga.

[21] Appl. No.: 439,495

[22] Filed: May 12, 1995

Related U.S. Application Data

[63] Continuation of Ser. No. 41,959, Apr. 2, 1993, abandoned.

[51] Int. Cl.$^6$ ............................ C04B 14/04; C04B 33/04
[52] U.S. Cl. ..................... 501/145; 501/146; 501/148; 106/416; 106/486; 106/487
[58] Field of Search ................................. 501/145, 146, 501/147, 148; 106/416, 486, 487

[56] References Cited

U.S. PATENT DOCUMENTS

| | | | |
|---|---|---|---|
| 3,846,147 | 11/1974 | Tapper | 501/147 |
| 4,017,324 | 4/1977 | Eggers | 501/148 |
| 4,078,941 | 3/1978 | Bundy et al. | 501/148 |
| 4,118,246 | 10/1978 | Horzepa et al. | 501/147 |
| 4,137,092 | 1/1979 | Cumpston | 106/486 |
| 4,186,027 | 1/1980 | Bell et al. | 501/147 |
| 4,309,222 | 1/1982 | Hoyt, 4th | 501/147 |
| 4,650,521 | 3/1987 | Koppelman et al. | 106/486 |
| 5,089,056 | 2/1992 | Shi et al. | 501/147 |

*Primary Examiner*—Mark L. Bell
*Assistant Examiner*—Michael Marcheschi
*Attorney, Agent, or Firm*—Jones & Askew

[57] ABSTRACT

A stable high solids structured clay slurry is manufactured by a process which comprises the sequential steps of forming a high solids slurry by mixing a structured clay material with water in a first stage mixing step under conditions which promote particle to liquid contact and which substantially prevent interaction between the structured clay particles, terminating the first stage mixing and then, in a second stage mixing step, mixing the high solids slurry under conditions which are different from the first stage mixing conditions and which promote substantial interaction between the structured clay particles.

32 Claims, No Drawings

STABLE HIGH SOLIDS SLURRIES OF STRUCTURED CLAY MATERIALS AND PROCESS FOR THE MANUFACTURE THEREOF

This is a continuation of application Ser. No. 08/041,959, filed Apr. 2, 1993, now abandoned.

TECHNICAL FIELD

This invention relates to a process for the manufacture of a stable slurry of structured clay materials. In a more specific aspect, this invention relates to a process for the manufacture of a stable slurry of calcined kaolin clay in which the slurry has a high solids content of calcined kaolin day.

This invention will be described with specific reference to a process for the manufacture of a stable high solids slurry of calcined kaolin clay, a structured clay material. However, this invention should be understood as applicable to the manufacture of stable high solids slurries of other structured clay materials. By the term "structured clay materials", we mean clay materials which have been modified by either chemical or thermal treatment. Specific examples of chemically-modified clay materials are the kaolin materials disclosed in Shi et al. U.S. Pat. No. 5,089,056 and the zeolite materials disclosed in Wason U.S. Pat. No. 4,812,299. Specific examples of thermally-modified clay materials are the calcined kaolin clay materials described in Fanselow et al. U.S. Pat. No. 3,586,523. Therefore, although especially useful in regard to calcined kaolin clay, this invention is applicable to other structured clay materials.

BACKGROUND OF THE INVENTION

Kaolin is a naturally occurring, relatively fine, white clay which may be generally described as a hydrated aluminum silicate. Kaolin clay is widely used as a filler and pigment in various materials, such as rubber and resins, and in various coatings, such as paints and coatings for paper.

The use of kaolin clay in paper coatings serves, for example, to improve the opacity of the coated paper. Opacity in such paper coatings is enhanced by the light scattering ability of the kaolin clay, and such ability can be estimated by the scattering coefficient as described in TAPPI, 1978, Vol. 61, No. 6, pages 78–80.

Calcined kaolin is a particular type of kaolin clay and is often used in large quantities for paper manufacture. Calcined kaolin can be obtained by heating beneficiated kaolin clay at temperatures of at least 600° C. Calcined kaolin has improved light scattering characteristics (as compared to the non-calcined kaolin) and, therefore, contributes a higher degree of opacity to the paper coating. If kaolin clay is dehydrated by calcination, the calcined kaolin clay will not return to its naturally occurring hydrated form upon contact with water, but will retain its new characteristics.

As large quantities of calcined kaolin clay are often used in the paper and other industries, the transportation of such material to the customer is the subject of considerable effort. At present, calcined kaolin clay is commonly shipped as either a dry powder or an aqueous slurry having a solids content of 48%–52%, by weight.

High solids slurries of calcined kaolin clay are desirable because tank cars and trucks could then be used for bulk shipments to increase cost effectiveness. However, calcined kaolin clay is dilatant in slurry form and, therefore, only moderate solids levels have previously been achieved on a commercial scale (i.e., 48%–52% solids).

At moderate solids levels, two problems are frequently encountered with calcined kaolin clay slurries. First, settling occurs when these slurries are permitted to stand without agitation. Second, these slurries can be too dilatant (i.e., too viscous) to be pumped by conventional means from tank cars or trucks.

High solids slurries of calcined kaolin clay are also desirable in paper manufacturing because increased coating solids, improved dryer efficiencies, improved coating properties and other advantages can be achieved.

Several methods have been proposed to provide stable high solids calcined kaolin slurries. For example, U.S. Pat. No. 3,754,712 subjects a suspension of calcined kaolin to wet-milling during which increments of calcined kaolin are added to the suspension until the desired high solids content is produced.

U.S. Pat. No. 4,017,324 provides an aqueous slurry of calcined clay and hydrated clay in which the total clay content is about 50%–75%, by weight.

U.S. Pat. No. 4,118,246 provides a stable high solids slurry of calcined clay through the use of one or more micromixers.

U.S. Pat. No. 4,118,245 provides a method for preparing stable high solids Slurries of calcined kaolin clay in which a non-stick grinding medium is used.

U.S. Pat. No. 4,374,203 provides a stable calcined clay slurry in which anionic and cationic polymers are present in the slurry.

However, for various reasons, the prior art fails to provide an acceptable process for producing high solids calcined kaolin slurries in which the rheological and light scattering properties of the calcined clay slurries are retained or improved. Therefore, a need exists in the kaolin industry for this type of process.

SUMMARY OF THE INVENTION

Briefly described, the present invention provides a stable high solids slurry of a structured clay material. More specifically, this invention provides a process for manufacturing a stable high solids structured clay slurry having improved rheological properties while retaining good opacifying characteristics. The following summary is directed to calcined kaolin clay, a preferred structured clay material.

The process of this invention may broadly be described as sequentially (a) forming a high solids slurry by mixing calcined kaolin clay with water under first stage mixing conditions which promote particle to liquid contact but which minimize (i.e., substantially prevent) interaction between the particles of calcined kaolin clay, (b) terminating the first stage mixing and (c) then mixing the high solids slurry under second stage mixing conditions to obtain substantial interaction between the particles of calcined kaolin clay. The resultant product is a stable high solids calcined kaolin clay slurry having improved rheological properties and good opacifying characteristics.

The sequence of steps in the above-defined process is critical. If the mixing conditions are reversed, the improved slurry of this invention is not obtained.

The process of this invention allows for optional steps. During the first stage mixing, for example, a dispersing agent, thickening agent, wetting agent or pH adjusting agent, or mixtures thereof, can be mixed with the high solids slurry to aid in maintaining a slurry form.

The present invention provides a stable high solids calcined kaolin clay slurry which can be handled and transported by various means, including tank cars and trucks, due to .the rheological properties of the slurry. In this application, the term "rheological properties" refers to the viscosity or flow characteristics of the slurry.

Additionally, the slurry produced by this invention can be used in applications when opacity is a desired feature. Thus, the slurry is especially useful in paper coating applications and in formulations for paints and resins.

Accordingly, an object of this invention is to provide a structured clay slurry having a high solids content.

Another object of this invention is to provide a stable high solids calcined kaolin clay slurry.

Another object of this invention is to provide a stable high solids calcined kaolin clay slurry having improved rheological properties and good opacifying properties.

Another object of this invention is to provide a process for manufacturing a calcined kaolin day slurry having a high solids content.

A further object of this invention is to provide a process for manufacturing a stable high solids calcined kaolin clay slurry.

A still further object of this invention is to provide a process for manufacturing a stable high solids calcined kaolin clay slurry having improved rheological properties and good opacifying properties.

A still further object of this invention is to provide a stable high solids calcined kaolin clay slurry which can be handled by conventional means and transported by various means, such as tank cars and trucks.

These and other objects, features and advantages of this invention will become apparent from the following detailed description.

DETAILED DESCRIPTION OF THE INVENTION

In accordance with the present invention, stable high solids slurries of structured clay are manufactured by a process in which first and then second stage mixing conditions are employed. In a preferred embodiment of this invention, one or more additives (e.g., dispersing agents, thickening agents, pH adjusting agents, wetting agents, etc.) are added during the first stage mixing.

The following detailed description of this invention is directed toward calcined kaolin clay, a preferred structured clay material.

For purposes of this invention, the term "high solids" refers to those slurries in which the content of calcined kaolin clay (or other structured clay material) is at least 55%, by weight. With the process of this invention, slurries having from about 58%–70% calcined kaolin clay, by weight, can be obtained. An especially preferred slurry manufactured by this process contains from about 60%–64% calcined kaolin clay, by weight.

In this invention, we have discovered that certain first stage mixing conditions, followed by certain second stage mixing conditions, can be effectively used to manufacture a high solids calcined kaolin clay slurry having improved rheological properties and good opacifying characteristics. By the term "improved rheological properties," we mean that the flow characteristics of our slurry (1) are improved over the flow characteristics of a conventional calcined kaolin clay slurry when the two slurries are compared at equivalent solids and (2) are such that our slurry can be worked and/or pumped by means which are conventional in the kaolin industry, depending on the desired use of the slurry. Additionally, by the term "good opacifying characteristics," we mean that the slurry of this invention can be effectively used in those applications when opacity is a desired feature, such as in paints and paper coatings.

This invention utilizes calcined kaolin clay as a starting material. The calcined kaolin clay can be manufactured by conventional, well-known processes, such as disclosed in Fanselow et al. U.S. Pat. No. 3,586,523.

In the first stage of this process, a slurry of calcined kaolin clay, water and any additives (optional) is formed under mixing conditions which minimize or substantially prevent interaction between the calcined kaolin clay particles. These first stage mixing conditions, however, are selected to promote particle to liquid contact (i.e., contact between the calcined kaolin clay particles and water) to wet the particles.

Equipment which is conventional in the kaolin industry can be used for the first stage mixing. For purposes of this invention, such mixing is accomplished when the mixer is operated at a shaft speed of 1,500 rpm or less, preferably less than 1,000 rpm. To achieve and maintain a good slurry, the mixing equipment preferably is operated at a shaft speed which will maintain a vortex in the slurry.

To insure the homogeneity of the slurry and thereby obtain a uniform slurry, the first stage mixing will preferably be operated for a time period of at least 15 minutes. The first stage mixing is terminated when a homogeneous slurry is obtained, and this may be determined by extraction, testing and/or observation of a sample.

Dispersing agents, thickening agents, pH adjusting agents, wetting agents or mixtures thereof can be effectively used during the first stage mixing to obtain various effects. Suitable dispersants include tetrasodium pyrophosphate, sodium hexametaphosphate, sodium polyacrylate, polyacrylic acid, ammonium polyacrylate, tetrapotassium pyrophosphate, sodium silicate, sodium meta-silicate. Preferred dispersants are sodium hexametaphosphate and sodium polyacrylate.

Suitable pH modifiers include sodium carbonate, sodium hydroxide, ammonium hydroxide and potassium hydroxide. Preferred pH modifiers are sodium carbonate and sodium hydroxide.

Suitable thickening agents include sodium carboxymethylcellulose, xanthan gum (sold under the trademark Kelzan by Merck & Co., Kelco Division) and compounds sold under the trademarks Aqualon AQUD 3204 and 3262A by Aqualon Co. (a division of Hercules, Inc.). Preferred thickening agents are sodium carboxymethylcellulose and the above-described xanthan gum.

Suitable wetting agents include sodium lauryl sulfate, sodium dioctylsulphosuccinate, polyoxyethylene sorbitan monolaurate, fatty amine ethoxylate, long chain amine acids and long chain substituted betaine. Preferred wetting agents are nonionic ethers, non-ionic esters, sodium dioctylsulphosuccinate, polyoxyethylene sorbitan monolaurate and the long chain amine acids.

If used, these additives are used in the amounts conventional in the kaolin industry.

After termination of the first stage mixing, the high solids calcined kaolin clay slurry is then subjected to a second stage mixing, preferably for a time period of at least 15 minutes. The maximum time will depend upon the rheological or opacifying characteristics which are desired for the final slurry product. In general, we have found that extended second stage mixing may continue to provide improved product rheology, but such extended mixing may adversely affect the opacifying characteristics of the final slurry product.

As is true with regard to the first stage mixing step, equipment which is conventional in the kaolin industry can be used for the second stage mixing. For purposes of this invention, such mixing is accomplished when the mixer is operated at a shaft speed above 1,500 rpm, preferably from about 2,000 to about 5,000 rpm.

The final high solids calcined kaolin clay slurry of this invention will preferably have a pH of from about 5 to about 10, most preferably from about 6.0 to about 8.0.

The purpose of first stage mixing is to obtain a homogeneous slurry by particle to liquid contact (i.e., wetting of the calcined kaolin clay particles). This mixing stage is especially significant because wetting of these particles can be a difficult task. Therefore, an essential feature of this invention is to select first stage mixing conditions which promote particle to liquid contact and which minimize interaction (i.e, physical contact) between the particles of calcined kaolin clay. These conditions can be, for example, of a mechanical and/or chemical nature, such as the use of certain mixers, wetting agents, mixing containers, dispersing agents, etc.

The purpose of second stage mixing is to obtain a final slurry of calcined kaolin clay which provides improved rheological properties for the slurry but without losing the good opacifying characteristics of the final slurry product. Therefore, another essential feature of this invention is to select second stage mixing conditions which promote interaction (i.e., physical contact) between the particles of calcined kaolin clay. These conditions can be, for example, of a mechanical nature, such as the use of a mixer or mixing container which is different from that used in the first stage mixing.

The conditions for the first and second stage mixing are different and can include variations in time, temperature, pressure, mixer blade type and configuration, diameter of mixer blade, use of mixing container with and without baffles, and any other factor which can be effectively used to achieve the results which are desired in these two mixing stages. For example, the container in which the first stage mixing occurs is preferably cylindrical and without baffles, while the second stage mixing container preferably is cylindrical and baffled.

The first and second mixing stages can be operated at ambient temperatures and pressures in the process of this invention. However, in both instances, an increase in temperature may be observed due to the mixing action. In either instance, the mixing container does not have to be jacketed for heating or cooling.

The opacity (or light scattering ability) of the final high solids slurry is determined by the scattering coefficient, which is measured by the method described in TAPPI, 1978, Vol. 61, No. 6, pages 78–80. Preferably, the slurries of this invention produce a scattering coefficient of from about 0.5 to about 1.6, most preferably at least about 0.8.

The viscosity (or rheological properties) of the final high solids slurry is determined by the TAPPI T648 om- 88 method, using a Hercules high shear viscometer. Preferably, the high solids slurries of this invention will have a final Hercules viscosity (in centipoises) of less than about 3600, most preferably less than about 1700 centipoises. The upper measurement limit of the Hercules high shear viscometer is 343,800 centipoises.

The present invention is further illustrated by the following examples which are illustrative of certain embodiments designed to teach those of ordinary skill in this art how to practice this invention and to represent the best mode contemplated for carrying out this invention.

EXAMPLES 1–4

Four samples are each made by mixing, under first stage mixing conditions, 6 kg. of calcined kaolin clay and water. The mixer is operated at approximately 1,000 feet per minute (tip speed) and contains two 4" diameter blades, with the lower blade being a 4-bladed paddle type with the blades pitched to obtain an upward pumping action. The upper blade is a 3-bladed paddle with a downward pumping action. The mixing container is cylindrical and non-baffled.

The time required to add 6 kg. of calcined kaolin day is 44 minutes per sample, and the mixing continues for a total of 1 hour for each sample. The slurry temperatures average about 57.8° C. after mixing, and the motor load ranges between 13.5–14.0 amps for these four samples. Each sample is optimally dispersed using 3 lbs. per ton of sodium polyacrylate and 2.5 lbs. per ton of sodium carbonate.

The first stage mixing is terminated, and each sample is then subjected to second stage mixing using a Cowles mixer operating at a shaft speed of 5,000 rpm, with the mixing time being varied from 15–60 minutes as shown in Table 1. The mixer uses conventional Cowles 3" diameter sawtooth blades. This second stage mixing is conducted in a cylindrical baffled container A slight surging in each sample is observed during the first 2–3 minutes of second stage mixing. The slurry temperatures average about 62.9–72.2° C., and the motor load ranges between 1.0–1.2 amps for these four samples. The solids content of each sample, after second stage mixing, is shown in Table 1.

Each sample is evaluated "as is," and then each solids content is adjusted to approximately 50%, by weight. The Hercules (high shear) viscosities are measured at each solids level and are shown in Table 1. These viscosities show that the two stage mixing process of this invention produces a high solids slurry having improved rheological properties when compared to a conventional slurry at equivalent solids.

TABLE 1

| Method | 2nd Stage Mixing Times (minutes) | Final Solids % (by weight) | Final Solids Hercules (centipoises) | Diluted Solids % (by weight) | Diluted Solids Hercules (centipoises) | Scattering Coefficient (at 457 nm) |
| --- | --- | --- | --- | --- | --- | --- |
| Conventional | — | 50.0 | 700 | — | — | — |
| Example 1 | 60 | 63.7 | 3126 | 50.4 | 5.2 | 0.98 |

TABLE 1-continued

| Method | 2nd Stage Mixing Times (minutes) | Final Solids % (by weight) | Final Solids Hercules (centipoises) | Diluted Solids % (by weight) | Diluted Solids Hercules (centipoises) | Scattering Coefficient (at 457 nm) |
|---|---|---|---|---|---|---|
| Example 2 | 45 | 63.7 | 3126 | 50.9 | 6.9 | 1.07 |
| Example 3 | 30 | 63.7 | 2865 | 50.3 | 5.2 | 1.05 |
| Example 4 | 15 | 63.2 | 3619 | 50.4 | 5.2 | 1.04 |

Data for the conventional method is published in the product specification sheet for Norcal slurry, a calcined kaolin clay product of Nord Kaolin Company, Jeffersonville, Georgia.

EXAMPLES 5–8

Four samples are made-down by mixing 7 kg of calcined kaolin clay and water. The mixer used in this first (wetting-out) stage contains two 4.1 inch diameter axial flow propellers and is operated at approximately 1,000 feet per minute (tip speed). The calcined kaolin clay is added at the rate of 0.2 kg per minute until all dry clay is incorporated to form an aqueous slurry of desired solids content. This mixing is continued for a total of 1 hour. Each sample is dispersed using 2 lbs. per ton of sodium polyacrylate (dry basis) and 2.5 lbs. per ton of sodium carbonate. The slurry temperature ranges between 54.5° C. and 58.6° C. after mixing. The motor load ranges between 13.5 amps and 14.5 amps.

The first stage mixing is stopped, and each sample is subjected to high intensity mixing using a mixer and a baffled container (as in Examples 1–4) operated at a tip speed of approximately 3900 ft. per minute. This mixing stage is varied from 15 to 60 minutes as shown in Table 2. The slurry temperatures range between 60° C. and 80° C. after mixing, and the motor load ranges from 1.0 to 1.5 amps. The solids content of each sample, after this second stage mixing, ranges from about 62.3 to about 62.5 solids, by weight. The pH of the slurry samples is between 6.8 and 7.1.

Each sample is also evaluated after adjusting the solids content to approximately 50%, by weight. The Hercules (high shear) viscosities are measured at each solids level. All samples are evaluated with a total of 3 lbs. per ton of sodium polyacrylate for optimum dispersant levels.

The viscosity data in Table 2 indicates a trend toward a lower Hercules viscosity as mixing time increases.

TABLE 2

| Example | Hercules (CPS) | Solids Content (by wt.) | Second Stage Mixng Time (minutes) | Scattering Coefficient at 457 nm. |
|---|---|---|---|---|
| 5 | 1564 | 62.5 | 60 | 0.99 |
| 5 | 6.9 | 50.5 | 60 | |
| 6 | 1910 | 62.3 | 45 | 0.92 |
| 6 | 6.9 | 50.3 | 45 | |
| 7 | 2865 | 62.4 | 30 | 1.06 |
| 7 | 6.9 | 50.3 | 30 | |
| 8 | 2750 | 62.4 | 15 | 1.07 |
| 8 | 6.8 | 50.5 | 15 | |

EXAMPLES 9–10

Two samples are made-down by mixing 7 kg of calcined clay and water. The first (wetting-out) stage for these two samples is the same as used in the previous Examples 1–4. The first stage of mixing is stopped after 1 hour total run time.

The second (high intensity) stage mixing for Example 9 is performed using the same blade configuration and tip speed as used during the first (wetting-out) stage. The container used in the second stage is the same baffled container utilized in Examples 1–4 for second stage mixing. The second stage is run for 1 hour total time. This sample contains 60.1% solids (by weight), and the pH is 6.9.

Example 10 is the same as Example 9 except that the tip speed is increased to approximately 1600 feet per minute during the second stage (high intensity) mixing. This sample contains 62.4% solids, by weight, and the pH is about 7.0

The sample from Example 9 is evaluated, and the results are shown in Table 3. The samples from Example 10 are also evaluated after adjusting the solids content to approximately 50% by weight. The Hercules viscosities are measured on all samples from Examples 9–10.

The viscosity data in Table 3 indicates that the conditions used in Example 9 produce a slurry of extremely high viscosity (greater than the limit of the viscometer). On the other hand, the viscosity data in Table 3 indicates that increased second stage mixing intensity produces a slurry with rheology which is improved over those of Example 9 and a conventional production slurry (Example 1 ).

TABLE 3

| Example | Hercules (Cps) | Solids Content (by wt.) | Sodium Polyacrylate (lbs./ton) | Scattering Coefficient at 457 nm |
|---|---|---|---|---|
| 9 | >343,800 | 62.3 | 2.0 | 1.13 |
| 10 | 2547 | 62.4 | 3.0 | 1.01 |
| 10 | 5.2 | 50.3 | 3.0 | |

EXAMPLES 11–13

Several samples are produced using the mixer and mixing container from the first stage mixing as described in Examples 1–4. These samples are made-down by mixing 7 kg of calcined clay and water. The mixing time is varied from 2 to 4 hours. All samples are dispersed using 2.5 lbs. per ton of sodium polyacrylate and 2.5 lbs. per ton of sodium carbonate. These samples are not subjected to a second stage mixing step.

The samples are evaluated after adjusting the solids content to be approximately 50% and 60%, by weight. The Hercules viscosities are measured on all samples.

The results in Table 4 indicate that this single step (low intensity) process is not as effective for the production of an improved low viscosity high solids calcined clay slurry, as demonstrated by the extremely high viscosities of the undiluted samples in Examples 11–13.

TABLE 4

| Example | Hercules (Cps) | Solids Content (by wt.) | Mixing Time (Hours) | Scattering Coefficient at 457 mm. |
|---|---|---|---|---|
| 11 | >343,800 | 61.4 | 2 | 1.09 |
| 11 | 6.9 | 49.9 | 2 | |
| 12 | >343,800 | 61.7 | 3 | 1.11 |
| 12 | 6.9 | 50.2 | 3 | |
| 13 | >343,800 | 62.9 | 4 | 1.07 |
| 13 | 6.9 | 50.2 | 4 | |

This invention has been described in detail with particular reference to certain embodiments, but variations and modifications can be made without departing from the spirit and scope of the invention as defined in the following claims.

What is claimed is:

1. A process for manufacturing a stable high solids slurry of a structured clay material, wherein the process comprises the sequential steps of:
   A. in a first stage, mixing structured clay particles with water under conditions which promote particle to liquid contact but which minimize particle to particle interaction, wherein a substantially homogeneous high solids slurry is produced;
   B. in a second stage, mixing the substantially homogeneous high solids slurry under conditions which are different from the first stage mixing conditions and which promote interaction between the structured clay particles, wherein a high solids structured clay slurry product having improved rheological properties and a scattering coefficient of at least 0.8 is produced.

2. A process as defined by claim I wherein the structured day material is calcined kaolin clay.

3. A process as defined by claim 1 wherein the second stage mixing produces a slurry having a structured clay content of at least 55%, by weight.

4. A process as defined by claim 1 wherein the second stage mixing produces a slurry having a structured clay content of from about 58%–70%, by weight.

5. A process as defined by claim 1 wherein the first and second stage mixing are each operated for at least 15 minutes.

6. A process as defined by claim 1 wherein the first stage mixing is conducted in a non-baffled container.

7. A process as defined by claim 1 wherein the second stage mixing is conducted in a baffled container.

8. A process as defined by claim 1 wherein the slurry product has a Hercules viscosity of less than about 3600 centipoises.

9. A process as defined by claim 1 wherein the scattering coefficient of the slurry product is from 0.8 to about 1.6.

10. A process for manufacturing a stable high solids slurry of a structured clay material, wherein the process comprises the sequential steps of:
    A. in a first stage, mixing structured clay particles with water and at least one material selected from the group consisting of dispersing agents, thickening agents, pH adjusting agents, wetting agents and mixtures thereof under conditions which promote particle to liquid contact but which minimize particle to particle interaction, wherein a substantially homogeneous high solids slurry is produced;
    B. in a second stage, mixing the substantially homogeneous high solids slurry under conditions which are different from the first stage mixing conditions and which promote interaction between the structured clay particles, wherein a high solids structured clay slurry product having improved rheological properties and a scattering coefficient of at least 0.8 is produced.

11. A process as defined by claim 10 wherein the structured clay material is calcined kaolin clay.

12. A process as defined by claim 10 wherein the dispersing agent is sodium hexametaphosphate, sodium polyacrylate or a mixture thereof.

13. A process as defined by claim 10 wherein the pH adjusting agent is sodium carbonate, sodium hydroxide or a mixture thereof.

14. A process as defined by claim 10 wherein the thickening agent is sodium carboxymethylcellulose, xanthan gum or a mixture thereof.

15. A process as defined by claim 10 wherein the wetting agent is a non-ionic ether, a non-ionic ester, sodium dioctylsulphosuccinate, polyoxyethylene sorbitan monolaurate, a long chain amine acid or a mixture thereof.

16. A process as defined by claim 10 wherein the slurry product has a pH of from about 6.0 to about 8.0.

17. A process as defined by claim 10 wherein the Hercules viscosity of the slurry product is less than about 3600 centipoises.

18. A process as defined by claim 10 wherein the slurry product as a scattering coefficient of from about 0.8 to about 1.6.

19. A high solids structured clay slurry manufactured by a process which comprises the sequential steps of:
    A. in a first stage, mixing structured clay particles with water under conditions which promote particle to liquid contact but which minimize particle to particle interaction, wherein a substantially homogeneous high solids slurry is produced;
    B. in a second stage, mixing the substantially homogeneous high solids slurry under conditions which are different from the first stage mixing conditions and which promote interaction between the structured clay particles, wherein a high solids structured clay slurry product having improved rheological properties and a scattering coefficient of at least 0.8 is produced.

20. A high solids structured clay slurry as defined by claim 19 wherein the structured clay is calcined kaolin clay.

21. A high solids calcined kaolin clay slurry as defined by claim 20 wherein the calcined kaolin clay is present in an amount of at least 55%, by weight.

22. A high solids calcined kaolin clay slurry as defined by claim 20 wherein the calcined kaolin clay is present in an amount of from about 58%–70%, by weight.

23. A high solids calcined kaolin clay slurry as defined by claim 20 wherein the first and second stage mixing are each operated for at least 15 minutes.

24. A high solids calcined kaolin clay slurry as defined by claim 20 wherein the first stage mixing is conducted in a non-baffled container.

25. A high solids calcined kaolin clay slurry as defined by claim 20 wherein the second stage mixing is conducted in a baffled container.

26. A high solids calcined kaolin clay slurry as defined by claim 20 having a Hercules viscosity less than about 3600 centipoises.

27. A high solids calcined kaolin clay slurry as defined by claim 20 having a scattering coefficient from about 0.8 to about 1.6.

28. A high solids calcined kaolin clay slurry as defined by claim 20 wherein, during the first stage mixing, at least one material selected from the group consisting of dispersing agents, thickening agents, pH adjusting agents, wetting agents and mixtures thereof is mixed with the calcined kaolin clay particles and water.

29. A high solids calcined kaolin clay slurry as defined by claim 28 wherein the dispersing agent is sodium hexametaphosphate, sodium polyacrylate or a mixture thereof.

30. A high solids calcined kaolin clay slurry as defined by claim 28 wherein the pH adjusting agent is sodium carbonate, sodium hydroxide or a mixture thereof.

31. A high solids calcined kaolin clay slurry as defined by claim 28 wherein the thickening agent is sodium carboxymethylcellulose, xanthan gum or a mixture thereof.

32. A high solids calcined kaolin clay slurry as defined by claim 28 wherein the wetting agent is a non-ionic ether, a non-ionic ester, sodium dioctylsulphosuccinate, polyoxyethylene sorbitan monolaurate, a long chain amine acid or a mixture thereof.

* * * * *